United States Patent

[11] 3,619,666

[72] Inventors Adel Abdel Aziz Ahmed
Somerville;
Mark Berwyn Knight, North Caldwell, both of N.J.
[21] Appl. No. 825,193
[22] Filed May 16, 1969
[45] Patented Nov. 9, 1971
[73] Assignee RCA Corporation

[54] TRIGGER CIRCUITS HAVING UNIFORM TRIGGERING VOLTAGES
8 Claims, 2 Drawing Figs.

[52] U.S. Cl. .......... 307/290, 307/235, 307/288, 307/318
[51] Int. Cl. .......... H03k 3/15
[50] Field of Search .......... 307/289, 290, 291, 292, 235; 330/30 D

[56] References Cited
UNITED STATES PATENTS
3,324,309 6/1967 Zeller, Jr. .......... 307/290
3,454,793 7/1969 Davies .......... 307/290

*Primary Examiner*—Donald D. Forrer
*Assistant Examiner*—L. N. Anagnos
*Attorney*—Edward J. Norton

ABSTRACT: A trigger circuit is disclosed of a type which can be constructed using integrated, semiconductor chip technology and which includes a thresholding circuit arranged to fix the triggering voltages thereof, whereby a large number of trigger circuits having uniform triggering voltages from chip-to-chip may be produced.

INVENTORS
ADEL ABDEL AZIZ AHMED &
MARK BERWYN KNIGHT

BY Simon Yaffee
ATTORNEY

TRIGGER CIRCUITS HAVING UNIFORM TRIGGERING VOLTAGES

This invention relates to trigger circuits which have uniform triggering voltages from circuit to circuit and which are particularly adapted to be applied to respective integrated circuits, or chips.

A transistorized trigger circuit is known which involves two transistors, there being both forward and backward coupling between the transistors. In such a circuit, one of the transistors is conducting while the other is nonconducting, and vice versa. The condition of conduction of the transistors can be changed by application of a voltage greater than a certain value to an input electrode of one transistor. The condition of conduction of the transistors may be changed back to the former condition by altering the voltage applied to the same input electrode to another value less than the first mentioned value. These voltages, which may be called the upper and the lower triggering voltages, must be different for the trigger circuit to be stable.

Of the known trigger circuits, each includes discrete elements comprising respective resistors which are connected between a main electrode of each of the transistors of the trigger circuit and a source of supply potential. Due to unavoidable differences in the components in the trigger circuits, the triggering voltages are not uniform from one trigger circuit to another. When the trigger circuit comprises discrete elements, it is possible to adjust the values of the resistors connecting the main electrodes of the transistors to the source of potential in order to adjust the triggering voltages to desired uniform values. However, it is difficult to provide for adjustment of the value of a resistor that is part of an integrated circuit or chip or to maintain accurate control of actual values from one chip to another.

It is an object of this invention to provide a trigger circuit whose triggering voltage may be set at desired values in the process of applying the circuit to a chip, thereby to provide many integrated circuits having the same triggering voltages, within close tolerances.

A triggering circuit is provided in which the coupling between a pair of amplifying devices includes a threshold device whose threshold voltage is varied between two values depending on the condition of conduction of one of the two amplifying devices. The threshold of the threshold device may be fixed by the voltage breakdown of a Zener diode or by the voltage at the junction of a plurality of resistors which comprise a voltage divider. Since it is possible to apply Zener diodes having uniform breakdown voltages, as well as series connected resistors having uniform ratios of resistances, to chips, the two triggering voltages of the so produced trigger circuits are substantially uniform from chip to chip.

The invention will be better understood upon reading the following description in connection with the accompanying drawing in which.

Figure 1:
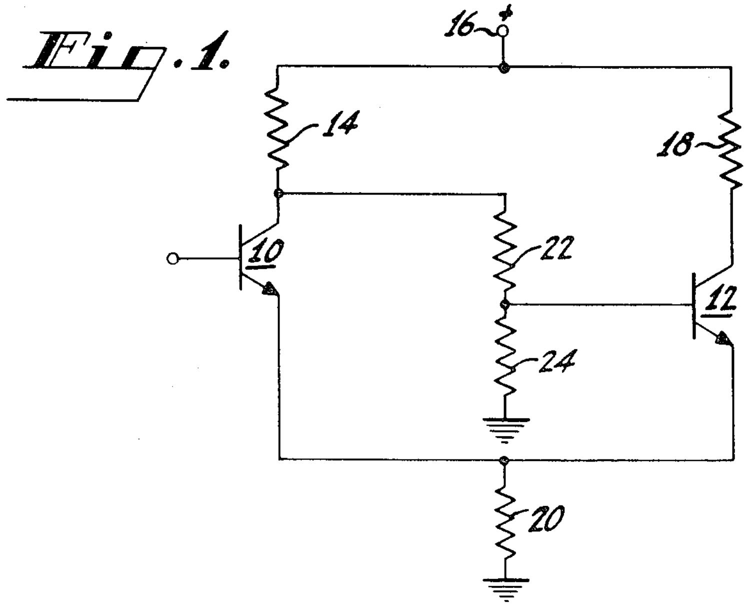
FIG. 1 is a circuit diagram of a prior art trigger circuit.

Turning first to FIG. 1, two NPN transistors 10 and 12 are provided. A resistor 14 is connected between the collector of the transistor 10 and a positive terminal 16 of a supply source, not shown. A resistor 18 is connected between terminal 16 and the collector of the transistor 12. A resistor 20 is connected between the emitters of the transistors 10 and 12 and ground. The collector of the transistor 10 is also connected to ground through two resistors 22 and 24 in series, and the junction of the resistors 22 and 24 is connected to the base of a transistor 12.

In the circuit described, very little or no current can flow through the transistor 10 since its base circuit is open. Current will flow through the resistors 14, 22 and 24 in series to ground. A positive potential will be applied to the base of the transistor 12 sufficient to render it conductive and current will flow through the resistor 18 the collector-to-emitter path of the transistor 12 and through the resistor 20 to ground. The transistor 12 may become saturated whereby its collector-to-emitter voltage is in the order of one-half of a volt.

Now let it be assumed that a voltage is applied between the base of the transistor 10 and ground starting at zero and going in a positive direction. When the applied voltage is zero, the voltages drop across the resistor 12 has been reduced sufficiently so that the transistor 12 is no longer current flow therethrough is sufficient to block the transistor 10. As the applied voltage builds up in a positive direction on the base of the transistor 10, a point will be reached when the transistor 10 will start to conduct. The voltage on the base of the transistor 12 will become less positive and after the base current of transistor 12 has been reduced sufficiently so that the transistor 12 is no longer saturated, less current will flow through the resistor 20 by way of the transistor 12. More current will then flow through the resistor 20 by way of the transistor 10, whereby still less current will flow through the transistor 12. This regenerative action will continue until, in a very short time, the transistor 10 will be fully conducting and the transistor 12 will be blocked or nonconducting. The voltage on the base of the transistor 10 which causes the change in conduction of the transistor 10 from nonconducting to conducting and the transistor 12 from conducting to nonconducting is called the higher or upper trigger voltage.

Now let it be assumed that a high positive voltage is applied to the base of the transistor 10 between its base and ground while the transistor 10 is conducting. Since the transistor 10 is saturated, this base voltage has no effect on the state of conduction of transistor 12. Now, let this positive base voltage be decreased gradually. At a certain value of this base voltage, the transistor 10 starts to decrease its conduction. The current flow through the resistor 20 decreases and the current flow through the resistors 22 and 24 increases and the base of the transistor 12 becomes more positive. By a regenerative action which is similar to the one mentioned above, the transistor 10 becomes less and less conducting and the transistor 12 becomes more and more conducting, whereby in a very short time the transistor 10 is nonconducting and the transistor 12 is saturated. The value of the voltage applied to the base of the transistor 10 which causes it to be blocked or nonconducting is lower than the above-mentioned upper trigger voltage and is called the lower trigger voltage. If another circuit such as that of FIG. 1 is built, it will not have the same upper and lower trigger voltages as the first one due to unavoidable variations in resistors and transistors. By variation of the value of the resistor 14, the lower trigger voltage is adjustable and by variation of the value of the resistor 18, the upper trigger voltage is adjustable. If a circuit such as that of FIG. 1 were put on an integrated, semiconductor chip, it would be very difficult to so determine the separate values of the resistors 14 and 18 in conjunction with variations in transistor characteristics as to give different chips the same trigger voltage values. Furthermore, the trigger voltage would be sensitive to changes in circuit elements caused by temperature variations. If leads were provided from the chip to adjustable resistor elements such as 14 and 18, the size and cost advantages of such chips would be impaired.

Figure 2:
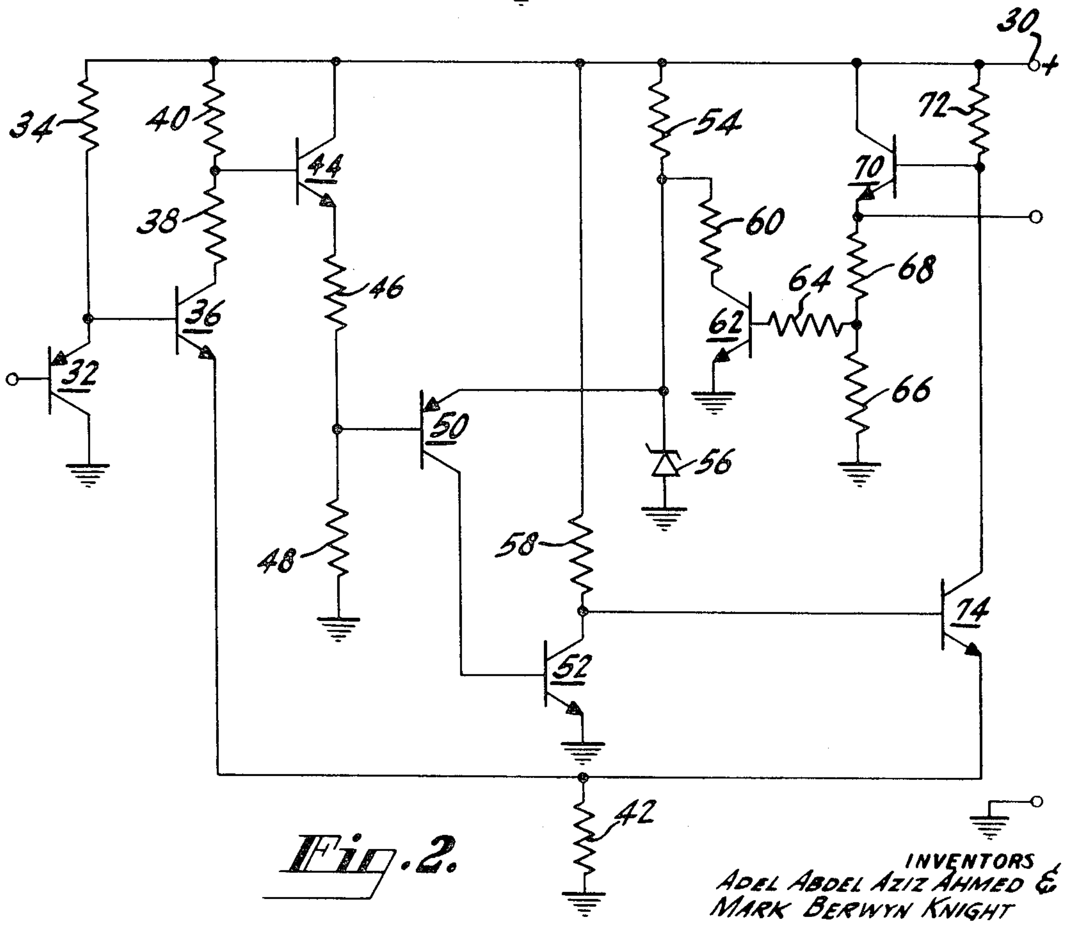
FIG. 2 is a circuit diagram of a trigger circuit which embodies the instant invention.

The triggering voltages of the trigger circuit of FIG. 2 do not depend on the values of circuit elements that are subject to independent variations in the manufacturing process. Turning to FIG. 2, the positive terminal 30 of a source of potential (not shown) is connected to the emitter of a PNP-transistor 32 through a resistor 34. The collector of the transistor 32 is connected to ground. The emitter of the transistor 32 is connected to the base of NPN-transistor 36 whose collector is connected to the terminal 30 through two resistors 38 and 40 in series. The emitter of the transistor 36 is connected through a resistor 42 to ground. The junction of resistors 38 and 40 is connected to the base of a NPN-transistor 44 whose collector is connected directly to the terminal 30. The emitter of the transistor 44 is connected through two resistors 46 and 48 in series to ground. The junction of the resistors 46 and 48 is connected to the base of PNP-transistor 50 whose collector is connected directly to the base of an NPN-transistor 52. The emitter of the transistor 50 is connected to the junction of a resistor 54 and a Zener diode 56. The resistor 54 and the Zener diode 56 are connected in series between the terminal 30 and ground. The collector of the transistor 52 is connected to the terminal 30 by way of resistor 58. The junction of the resistors 54 and the diode 56 is connected by way of a resistor 60 to the collector of an NPN-transistor 62 whose emitter is connected to ground. The base of the transistor 62 is connected by way of two resistors 64 and 66 in series to ground. The junction of the two resistors 64 and 66 is connected through a resistor 68 to the emitter of an NPN-transistor 70 whose collector is connected directly to the terminal 30 and whose base is connected to the terminal 30 by way of a resistor 72. The collector of the transistor 52 is connected directly to the base of an NPN-transistor 74. The collector of the transistor 74 is connected to the base of the transistor 70 and the emitter of the transistor 74 is connected to the emitter of the transistor 36. Triggering voltage input for the described triggering circuit is applied between the base of the transistor 32 and ground, and the triggered output voltage of the described circuit may be obtained between the emitter of the transistor 70 and ground.

Operation of the circuit of FIG. 2 is as follows. In its quiescent state where there is no connection between the base of the transistor 32 and ground, the transistor 32 is nonconducting. Current flows into the base of the transistor 36, and the transistor 36 is fully conducting or saturated. The collector-to-emitter current for the transistor 36 flows through the resistor 42, 38 and 40 in series. Due to the connection of the base of the transistor 44 to the junction of the resistor 40 and 38, the base voltage and emitter voltage of the transistor 44 are substantially less positive than the supply voltage 30. Due to the connection of the base of transistor 50 to the junction of resistors 46 and 48 and due to the voltage applied to the emitter of transistor 50, the transistor 50 is conducting but on the verge of being nonconducting. Due to the connection of the collector of transistor 50 to the base of transistor 52, the transistor 52 is conducting. The current through resistor 58 via the collector of transistor 52 is sufficiently large so that the voltage at the base of transistor 74 causes the transistor 74 to be blocked or nonconducting. The base voltage and emitter voltage of transistor 70 are therefore substantially near the supply voltage 30. Also, the transistor 62 is conducting to the extent of being saturated. Current therefore flows from the source terminal 30 through the resistor 54, the resistor 60 and the collector to emitter path of the transistor 62 to ground, whereby the voltage on the emitter of the transistor 50 is fixed at a value depending substantially on the ratio of the values of the resistors 54 and 60. As noted above, the voltage on the emitter of the transistor 50 is such that the transistor 50 is on the verge of being nonconducting. The current flow in the resistor 42 depends substantially on the values of resistors 40, 42 and 38 and the voltage of the supply source and is affected very little by the saturated transistor 36. Furthermore, the voltage at the junction of resistor 42 and the emitter of transistor 36 is substantially dependent on the ratios of values of resistor 42 to the sum of the resistors 38 and 40 and the value of supply voltage 30.

Now let it be assumed that a voltage is applied to the base of the transistor 32 with respect to ground which starts at a value near the supply voltage 30 and decreases toward zero. Transistor 32 remains nonconducting until the base of the transistor 32 reaches a value about seven-tenths a volt (assuming that silicon transistors are used) less positive than the base of the transistor 36. Any further reduction in voltage at the base of transistor 32 will cause a similar change in voltage on the base of transistor 36. Since the voltage on the base of the transistor 36 is going more negative, the current flow through the resistor 40, 38 and 42 decreases. The voltage on the base of transistor 44 therefore increases in a positive direction causing the emitter voltage of transistor 44 to follow the change. The current flow through the resistors 46 and 48 increases and soon the voltage on the base of the transistor 50 is within 0.7 of a volt of being positive with respect to the emitter thereof, whereby the transistor 50 becomes less conducting. It is noted that the point where the transistor 50 becomes nonconducting depends on the voltage on the emitter thereof which in turn depends on the voltage drop at the junction of the resistors 54 and 60. When the transistor 50 becomes less conducting, it renders the transistor 52 less conducting which renders the previously nonconducting transistor 74 conducting. This causes the voltage at the emitters of transistors 36 and 75 to rise. The regenerative process continues until transistor 36 becomes nonconducting and transistor 74 fully conducting. The collector of the transistor 74 is now at a lower voltage than its previous state. This voltage is dependent on the ratio of values of resistor 72 and resistor 42. The voltage at the emitter of transistor 70 is therefore about seven-tenths of a volt below this level. The values of resistors 64, 66 and 68 are so chosen that, in this condition, the transistor 62 becomes nonconducting and the voltage across the Zener diode 56 rises to its breakdown voltage and a new higher voltage, which depends on the breakdown voltage of the Zener diode 56, is applied to the emitter of the transistor 50. The voltage on the base of the transistor 32 that causes the transistor 74 to become conducting is the lower triggering voltage of the trigger circuit of FIG. 2.

Now let it be assumed that the transistor 36 is fully nonconducting and the voltage on the base of the transistor 32 goes up in a positive direction taking with it the voltage at the base of the transistor 36. The transistor 36 becomes conducting and the voltage at the emitter of the transistor 44 becomes less positive and the voltage at the base of the transistor 50 becomes less positive. The transistor 50 is nonconducting as noted above. The emitter of the transistor 50 is now at a more positive potential with respect to ground, due to the conduction of the transistor 74 and due to the consequent nonconduction of the transistor 62 than when the transistor 74 was nonconducting. The transistor 50 now becomes conducting when its base becomes less positive than its emitter by about seven-tenths of a volt. The transistor 52 also becomes conducting and the transistor 74 becomes nonconducting. The regenerative action previously described functions during this transition. The transistors 70 and 62 become conducting and the voltage across the Zener diode 56 drops below its breakdown voltage. The voltage on the emitter of the transistor 50 goes back down to its previously lower potential. Therefore the transistor 50 becomes conducting and nonconducting at different positive potentials on its base due to different conditions of conduction of the transistor 74. The different conditions of conduction of the transistor 74 follows from different potentials applied to the base of the transistor 32.

Since no current is flowing through the transistor 74, the transistor 36 is saturated due to the described regenerative action including the operation of the resistor 42. The triggering voltage at the base of the transistor 32 that causes the transistor 74 to become nonconducting is higher positive than a triggering voltage on the base of the transistor 32 that causes the transistor 74 to become conducting. The upper and lower trigger voltages are dependent upon the ratio of the values of resistor 72 and resistor 42 and the ratio of the sum of values of resistors 40 and 38 and the value of resistor 42 respectively. The voltage breakdown of the Zener diode 56 and the ratio of the values of resistor 54 and resistor 60, which can be predetermined when applying the two resistors 54 and 60 and the Zener diode 56 to a semiconductor chip, are suitably chosen so as to fulfill the conditions previously described. The transistor 50 and the means that causes changes in the voltage at the emitter thereof comprise a threshold circuit having two thresholds in which the change from one threshold to another is determined by the state of conductivity of the transistor amplifying device 74.

While the Zener diode determines one of the mentioned thresholds, a resistor can be substituted for the Zener diode 56. In that case, one threshold is determined by the ratio of the resistors 54 and 60 and the resistor (not shown) that was substituted for the Zener diode 56, said last mentioned two resistors being taken in parallel. The other threshold of the threshold device is determined by the ratio of the resistor 54 to the resistor (not shown) that is substituted for the Zener diode 56.

What is claimed is:

1. A trigger circuit comprising at least first and second transistor amplifiers which may be conditioned to exhibit either high or low conductivity, each transistor having a control electrode and two main electrodes,
   first means for coupling one main electrode of said first one of said amplifiers with one main electrode of said second one of said amplifiers and second means for coupling the control electrode of said second one of said amplifiers to the other main electrode of said first one of said amplifiers whereby when the first of said amplifiers exhibits high conductivity the second one thereof exhibits low conductivity and when the first of said amplifiers exhibits low conductivity the second of said amplifiers exhibits high conductivity,
   said second coupling means including a threshold means having two different thresholds, and
   threshold adjustment means to adjust said second coupling means to exhibit one or the other of said thresholds in accordance with the condition of conductivity exhibited by said second amplifier.

2. The invention as expressed in claim 1 in which said threshold adjusting means comprises two voltage standard means having different standard voltages.

3. The invention as expressed in claim 1 in which said threshold adjusting means comprises two voltage standard means having different standard voltages and in which one of said voltage standard means includes a voltage breakdown element.

4. The invention as expressed in claim 1 in which said threshold adjusting means comprises two voltage standard means having different standard voltages and in which one of said voltage standard means includes a voltage divider.

5. A trigger circuit comprising
   a first, second and third transistor each having a control electrode and a pair of main electrodes,
   a coupling between a main electrode of said first transistor to the control electrode of said second transistor,
   means to apply a voltage having two discrete values between the main electrodes of said second transistor,
   means to couple a main electrode of said second transistor to the control electrode of said third transistor whereby the condition of conductivity of said third transistor is varied and
   means responsive to the change in conductivity of said third transistor to change the voltage applied by said voltage applying means from one of said discrete values to another of said discrete values.

6. The invention as expressed in claim 5 in which said last named means includes a resistor and a voltage standard means connected in series across the terminals of a source of supply voltage and a second resistor and the main electrodes of a fourth transistor connected across said voltage standard means and means responsive to the conductivity of said third transistor to vary the conductivity of said fourth transistor.

7. A trigger circuit comprising
   a first and a second transistor each having a pair of main electrodes and a control electrode,
   a connection from a terminal of a source of unidirectional potential through separate resistors to the main electrode of respective ones of -said first and second transistors,
   a connection through a common resistor from the other main electrode of said first and second transistor to the other terminal of said source,
   a coupling device having two thresholds connected between a main electrode of said first transistor and the control electrode of said second transistor whereby the condition of conductivity of said second transistor is changed upon applying a triggering voltage to the control electrode of said first transistor and
   means to change the threshold of said coupling means from one of its thresholds to the other thereof in response to a change of conductivity of said second transistor.

8. The invention as expressed in claim 7 in which said coupling device includes a third transistor having a base electrode and a pair of main electrodes and in which two discrete values of voltage are applied across the main electrodes of said third transistor to provide said two thresholds in response to change of conductivity of said second transistor.

* * * * *

UNITED STATES PATENT OFFICE

CERTIFICATE OF CORRECTION

Patent No. 3,619,666 Dated November 9, 1971

Inventor(s) Adel Abdel Aziz Ahmed and Mark Berwyn Knight

It is certified that error appears in the above-identified patent and that said Letters Patent are hereby corrected as shown below:

| | |
|---|---|
| Column 2, line 4 | "voltages" should be --voltage-- |
| Column 2, line 4 | After "resistor" delete "12 has been reduced sufficiently so that the transistor 12 is no longer" and insert -- 20 due to the --- |
| Column 3, lines 73-74 | After "is" delete -- with 0.7 of a volt being -- |
| Column 4, line 8 | "75" should be -- 74 -- |

Signed and sealed this 9th day of May 1972.

(SEAL)
Attest:

EDWARD M.FLETCHER,JR.
Attesting Officer

ROBERT GOTTSCHALK
Commissioner of Patents

RM PO-1050 (10-69)

USCOMM-DC 60376-P69
☆ U.S. GOVERNMENT PRINTING OFFICE : 1969 O—366-334